April 18, 1961  R. M. DILLE ET AL  2,980,523
PRODUCTION OF CARBON MONOXIDE AND HYDROGEN
Filed Dec. 1, 1958
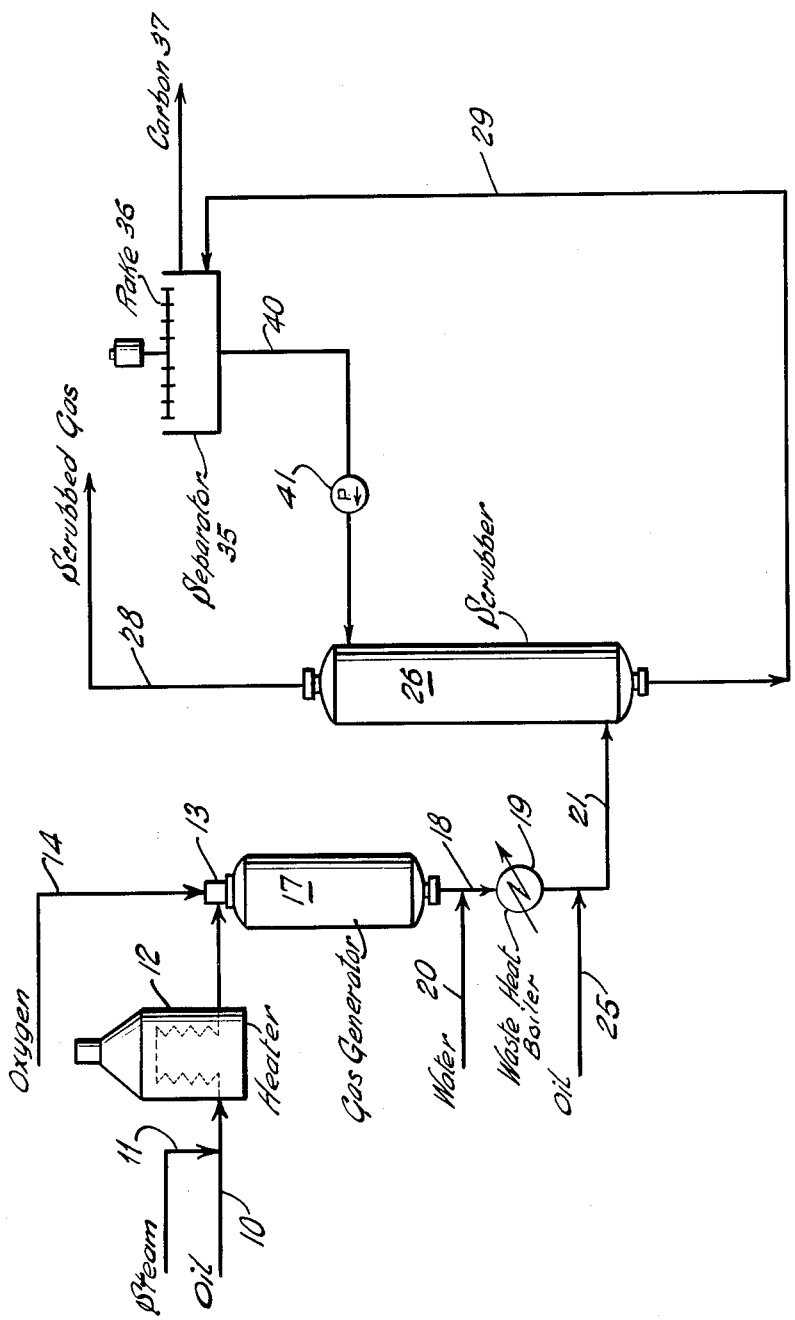

United States Patent Office 2,980,523
Patented Apr. 18, 1961

2,980,523

PRODUCTION OF CARBON MONOXIDE AND HYDROGEN

Roger M. Dille and Ronald W. Chapman, Whittier, and John C. Ahlborn, Monterey Park, Calif., assignors to Texaco Inc., a corporation of Delaware Filed Dec. 1, 1958, Ser. No. 777,275

7 Claims. (Cl. 48—215)

This invention relates to a process for the production of carbon monoxide and hydrogen from carbonaceous fuels by reaction with oxygen. In one of its more specific aspects it is directed to a method of separating carbonaceous solid entrained in the gaseous products of reaction of carbonaceous fuels and oxygen wherein said products are contacted with a limited amount of liquid hydrocarbon and thereafter scrubbed with water, and said carbonaceous solid is decanted from said clarified water.

The generation of carbon moxoxide and hydrogen by the partial oxidation of carbonaceous fuels is a highly economic method of producing these gases. In the partial oxidation process, a carbonaceous fuel, for example, coal, petroleum oil, or natural gas, is reacted with an oxygen-containing gas, for example, air, oxygen enriched air or substantially pure oxygen. Reaction is effected in a closed, compact reaction zone at an autogenous temperature within the range of about 1800 to 3500° F. preferably about 2200 to 2800° F. Preheating the reactants is generally desirable. The reaction zone is free from packing and catalyst and has nearly minimum internal surface. The reaction zone is maintained at a pressure above about 100 pound per square inch gauge and may be as high as about 600 pounds per square inch gauge. Steam may be introduced into the reaction zone to assist in the dispersion of the fuel into the reactor, to assist in control of the reaction temperature, and as a reactant to increase the relative amount of hydrogen produced. The products consist essentially of carbon monoxide and hydrogen and relatively small amounts of water vapor, carbon dioxide, and entrained carbonaceous solid. The carbonaceous solid is in the form of very fine carbon particles, and upon separation is useful as carbon black. The entrained carbon is removed readily from the gaseous partial oxidation products by scrubbing the carbon containing gas stream with water. The entrained carbon appears to contain some chemisorbed oxygen and is wet by water forming a suspension of carbon particles. Pumpable suspensions of carbon in scrubbing water may contain up to about 1 or 2 percent carbon. This carbon may be separated from the scrubbing water by filtration. The unusual characteristics of carbon from the partial oxidation process results in the formation of a filter cake which contains a maximum of about 15 percent carbon, the remainder being water. The entrained carbon may also be separated from the gaseous products by scrubbing with an oil. However, the carbon-oil slurry which is formed, although of a considerably higher solids concentration than the slurry formed with water, requires an amount of oil which may be 10 to 15 times the amount of carbon. Carbon can be separated from oil slurries, but with some difficulty.

We have discovered that the entrained carbon particles may be treated with a relatively small amount of oil before scrubbing with water to render the particles hydrophobic. The gaseous products containing entrained oil-treated carbon are then scrubbed with water to effect separation of the solids from the gas. The scrubbing water with the oil-treated carbon in suspension is passed to a quiescent settling zone where the oil-treated carbon floats to the surface of the water. The floating carbon is then easily separated by a simple decantation process. Advantageously, the carbon may be separated from the scrubbing water in a settling tank provided with rakes adapted to remove floating solids from the water surface.

Oil suitable for use in the process of this invention include hydrocarbons, a substantial portion of which are liquid at the pressure and temperature of the contacting zone. Suitable hydrocarbons, for example, include heavy oils such as gas oils, residual oils and heavy fuel oils, which may be employed at temperatures up to about 800° F. or higher. Lighter hydrocarbons such as gasoline and kerosene may be employed at lower contacting temperatures such that a substantial portion of the hydrocarbon remains liquid at the prevailing pressure. An amount of hydrocarbon within the range of about 0.5 to 2.0 times the oil absorption value of the entrained carbon is injected into the gas generator effluent. Oil absorption value is a criterion of the amount of oil necessary to wet a particular sample of carbon. The oil absorption value is determined by adding increments of alkali-refined linseed oil to a 1.00 gram sample of carbon, and mixing with a spatula between each addition until a single coherent ball of paste is formed which does not break down after forming. The procedure for this test is described in detail in ASTM test D281–31. The oil absorption value is expressed as cubic centimeters per gram. Oil absorption value may be converted from cubic centimeters per gram to units of gallons per hundred pounds by applying a factor of 12. The oil absorption value of carbon produced in the partial oxidation of carbonaceous fuels typically varies within the range of about 0.2 to 5.0 cubic centimeters per gram, equivalent to about 2.4 to 60 gallons per hundred pounds. An amount of hydrocarbon equal to the oil absorption value is preferred for rapid separation of the oil treated carbon from scrubbing water. In accordance with the process of this invention, the product gas stream is treated wth liquid hydrocarbon at a rate within the range of about 1.2 to 120 gallons per hundred pounds of entrained carbonaceous solid.

In treating the gaseous partial oxidation products with oil, it is desirable to avoid cracking of the oil if high purity carbon monoxide and hydrogen mixtures are desired. Cracking results in dilution of the carbon monoxide and hydrogen with gaseous hydrocarbons as well as increasing the amount of oil required for its hydrophobic effect. Cracking of the oil may be avoided by partially cooling the gas generator effluent to a temperature below about 800° F. The gas generator effluent may be cooled by indirect heat exchange in a waste heat boiler or with a water quench before contact with the oil. Advantageously, cracking may be prevented by introducing the oil in the form of an oil-water emulsion in which case the latent heat of vaporization of water effectively prevents the oil temperature from exceeding cracking temperatures and additionally effects dispersion of the oil into the treating zone facilitating rapid contact of the oil with the carbon particles. Efficient contacting of the injected oil with the entrained carbon may be obtained by spraying the oil or oil-water emulsion into the transfer line between the gas generator and the scrubbing zone preferably at least 20 pipe diameters upstream of the scrubbing zone. The gas generator effluent may be cooled to any desired temperature so long as the temperature is not reduced below the dew point of water at the prevailing presence before contacting with the oil.

Product gases issuing from the gas generation step contain a large amount of sensible heat. This heat may be employed to convert water to steam. If the synthesis gas is to be passed to a process requiring additional steam, for example, a water gas shift process, steam may be generated by introducing water directly into the effluent gases from the gas generator. Where steam admixed with the synthesis gas stream is not desired, heat may be recovered from the gas generator effluent by passing the gases in indirect heat exchange through heat exchangers or waste heat boilers. Steam for process or power use is advantageously produced in such waste heat boilers. Preheating of process streams, for example, fuel to the gas generation step, may be effected by heat exchange with the generator effluent.

The entrained oil-treated carbon is effectively removed from the product gases by contacting with water in gas-liquid contact apparatus, for example, spray towers, bubble towers, baffle towers or packed towers. Further, cooling of the synthesis gas may also be effected in the scrubbing zone by vaporizing a part of the scrubbing water, by cooling the scrubbing water, or both. It is desirable to maintain the solids content of the water in the scrubbing zone less than about 2 percent solids and preferably about 1 percent solids for satisfactory pumpability. The solids content is controlled by withdrawing a portion of solids dispersion from the bottom of the scrubbing zone, removing the solids therefrom and returning clarified water to the top of the scrubbing zone. Efficient washing may require higher scrubbing liquid rates than the amount of liquid required to carry the separated carbon, and so a portion of the solids dispersion may be recycled to provide sufficient scrubbing liquid. The temperature of the dispersion withdrawn from the scrubbing zone is advantageously maintained at a high temperature to facilitate succeeding process steps. The scrubbing temperature can, of course, be no higher than the boiling point of water at the prevailing pressure. A substantial temperature differential may be maintained in the scrubbing zone by introducing cooled scrubbing water at the top of the scrubbing zone so that the clean scrubbed gas is discharged at a relatively low temperature and corresponding low water vapor content. It is desirable to operate the scrubber at high pressure, that is, substantially the pressure of the gas generator with allowance for pressure drop through lines and heat transfer equipment. The use of high pressures makes possible the use of relatively high temperatures in the scrubbing zone, effects advantages in succeeding process steps, and delivers the product gas for use with a minimum of compression.

An advantage of the process of this invention is that carbon is effectively and efficiently removed from synthesis gas.

Another advantage of the process of this invention is that the carbon formed in the manufacture of synthesis gas is separated as a dry-appearing solid suitable for use as carbon black.

Another advantage of this process is that heat contained in gas generation products is efficiently utilized.

Having set forth its general nature the invention will be best understood from the more detailed description hereinafter which refers to the accompanying drawing. Although the drawing illustrates one arrangement of apparatus in which the process of this invention may be practiced it is not intended to limit the invention to the particular apparatus or material described.

Oil in line 10 is admixed with steam from line 11 and the mixture passed through heater 12 to gas generator burner 13. Oxygen in line 14 is admixed with the steam-oil mixture in burner 13. The steam, oil and oxygen react in gas generator 17 at an autogenous temperature of about 2800° F. and 300 pounds per square inch gauge to produce a synthesis gas comprising carbon monoxide and hydrogen. Additionally, the synthesis gas contains entrained carbon amounting to about 2 percent of the carbon content of the oil feed. Hot synthesis gas from gas generator 17 is withdrawn through line 18 and passed to waste heat boiler 19 where the synthesis gas is cooled by the generator of steam. Additional cooling may be effected by the direct injection of water from line 20 into the hot gaseous effluent in line 18. Cooled synthesis gas at a temperature below the cracking temperature of gas oil is withdrawn from waste heat boiler 19 through line 21. Gas oil in line 25 at a rate of about 5 gallons per hundred pounds of entrained carbon is sprayed into line 21. The synthesis gas and entrained oil-treated carbon in line 21 is passed to scrubber 26 where it is contacted in countercurrent flow with scrubbing water introduced through line 27. Synthesis gas substantially free of entrained carbon is withdrawn through line 28 and discharged for utilization not shown.

Scrubbing water comprising about 1 percent dispersed carbon is withdrawn from scrubber 26 through line 29 at a temperature of about 270° F. The scrubbing water-carbon dispersion is withdrawn through line 29 and passed to separator 35 where velocities are low and oil-treated carbon floats to the surface of the water. Clarified water and floating carbon are separated by skimming the floating carbon from the water surface with a rotating rake 36. Carbon raked off the top of separator 35 is discharged through line 37 to drying and packaging facilities not shown. Clarified water is withdrawn from separaor 35 through line 40 and is passed by pump 41 through line 27 to scrubber 26.

*Example*

Synthesis gas is produced by the partial oxidation of a bunker fuel oil at a temperature of 2600° F. and at 250 pounds per square inch gauge. In the generation of the synthesis gas, 2 percent of the carbon content of the fuel oil is unconverted to gaseous products and appears as entrained carbon in the product gas. The entrained carbon has an oil absorption value of 32 gallons per hundred pounds. The hot synthesis gas is cooled to 400° F. and steam is generated by passing the synthesis gas through a waste heat boiler. Gas oil at a rate of 28 gallons per hundred pounds of entrained carbon is sprayed into the cooled synthesis gas stream. The cooled gas containing entrained oil-coated particles is scrubbed with water in a scrubber maintained at 248 pounds per square inch gauge. Scrubbing water containing 1 percent entrained carbon is withdrawn, cooled to a temperature of 165° F. and passed to a settling tank. Oil-coated carbon in the form of a light, fluffy, dry appearing solid is skimmed off the top of the clarified water and the clarified water is returned to the scrubbing zone.

Obviously many modifications and variations of the invention, as hereinbefore set forth, may be made without departing from the spirit and scope thereof and only such limitations should be imposed as are indicated in the appended claims.

We claim:

1. In a process for the production of carbon monoxide and hydrogen from carbonaceous fuels wherein said fuel is reacted with an oxygen-containing gas in a reaction zone to produce a product gas stream comprising carbon monoxide, hydrogen and entrained carbonaceous solid, and said product gas stream is contacted with water in a gas scrubbing zone effecting removal of carbonaceous solid from said gas stream, the improvement which comprises contacting said gas stream comprising carbon monoxide, hydrogen and entrained carbonaceous solid with liquid hydrocarbon in an amount within the range equivalent to about 0.5 to 2.0 times the oil absorption value of said entrained carbonaceous solid and insufficient to effect removal of said entrained solid from said gas stream before contacting said product gas stream with said water rendering said carbonaceous solid hydrophobic and thereafter scrubbing said gas stream with water effecting removal of said carbonaceous solid from said gas stream.

2. The process of claim 1 wherein said liquid hydrocarbon is contacted with said product gas stream at a temperature above the dew point of water at the prevailing pressure.

3. The process of claim 1 wherein said liquid hydrocarbon comprises a gas oil.

4. The process of claim 1 wherein said gas stream is cooled to about 800° F. before contacting with said liquid hydrocarbon.

5. The process of claim 1 wherein said gas stream is contacted with an oil-water emulsion of said liquid hydrocarbon prior to scrubbing said gas stream with water.

6. A process for the production of hydrogen and carbon monoxide from carbonaceous fuels which comprises reacting said fuel with oxygen in an unpacked reaction zone at an autogenous temperature within the range of about 1800 to 3500° F. and at a pressure within the range of about 100 to about 600 pounds per square inch gauge producing a hot gas stream comprising hydrogen, carbon monoxide, water vapor, and entrained carbonaceous solid, partially cooling said hot gas stream to a temperature below about 800° F., contacting the partially cooled gas stream with a hydrocarbon oil in an amount within the range equivalent to about 0.5 to 2.0 times the oil absorption value of said entrained carbonaceous solid and insufficient to effect removal of said entrained solid from said gas stream effecting formation of an oily hydrophobic coating on said carbonaceous solid, separating oil coated carbonaceous solid from said gas stream by scrubbing said gas stream with water in a scrubbing zone, passing a water suspension of said oil coated carbonaceous solid from said scrubbing zone to a quiescent settling zone, and separately withdrawing said oil-coated solid and said clarified water from said settling zone.

7. The process of claim 6 wherein said clarified water is recycled to said scrubbing zone effecting separation of oil-coated carbonaceous solid from additional product gas.

References Cited in the file of this patent
UNITED STATES PATENTS

| | | |
|---|---|---|
| 1,959,945 | Bowman | May 22, 1934 |
| 2,793,938 | Frank | May 28, 1957 |
| 2,822,062 | Haberl et al. | Feb. 4, 1958 |